(12) United States Patent
Kapoor et al.

(10) Patent No.: US 9,655,038 B2
(45) Date of Patent: May 16, 2017

(54) EFFICIENT ROAMING OF MOBILE CLIENTS

(71) Applicant: Aruba Networks, Inc., Sunnyvale, CA (US)

(72) Inventors: Prateek Kapoor, Bangalore (IN); Amit Madan, Bangalore (IN); Santashil PalChaudhuri, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 34 days.

(21) Appl. No.: 14/525,615

(22) Filed: Oct. 28, 2014

(65) Prior Publication Data

US 2016/0119838 A1    Apr. 28, 2016

(51) Int. Cl.
*H04W 36/08* (2009.01)
*H04W 48/20* (2009.01)

(52) U.S. Cl.
CPC .................................. *H04W 48/20* (2013.01)

(58) Field of Classification Search
CPC ..... H04W 36/08; H04W 36/14; H04W 36/30; H04W 36/0016
USPC .......................... 370/331, 332, 329; 455/436
See application file for complete search history.

(56) References Cited

U.S. PATENT DOCUMENTS

| | | | |
|---|---|---|---|
| 2003/0148765 A1* | 8/2003 | Ma ..................... | H04W 36/32 455/438 |
| 2003/0206658 A1* | 11/2003 | Mauro, II ............. | H04N 19/51 382/239 |
| 2006/0068731 A1* | 3/2006 | Seier ................. | H04M 1/72516 455/226.2 |
| 2007/0207816 A1* | 9/2007 | Spain, Jr. ............. | H04W 64/00 455/456.1 |
| 2010/0284345 A1* | 11/2010 | Rudrapatna ......... | H04W 72/082 370/329 |
| 2011/0237259 A1* | 9/2011 | Dimou .............. | H04W 36/0061 455/437 |

* cited by examiner

*Primary Examiner* — Jamal Javaid

(57) ABSTRACT

The present disclosure discloses a method and a network device for efficient mobile client device roaming in a wireless local area network with multiple access points. Specifically, a network device determines a first received signal strength value for a first set of signals transmitted between a client device and a first access point during a first time period; and, determines a second received signal strength value for a second set of signals transmitted between a client device and the access point during a second time period. Based on the first and the second signal strength values, the network device computes a change in signal strength value corresponding to wireless communication between the client device and the first access point. Based on the change in signal strength value, the network device selects the access point from a plurality of access points for providing network access to the client device.

18 Claims, 7 Drawing Sheets

| AP 310 | SIGNAL STRENGTH S1 320 | SIGNAL STRENGTH S2 330 | TIME t1 340 | TIME t2 350 | dS/dt 360 | (dS/dt)/S2 370 |
|---|---|---|---|---|---|---|
| AP1 | 55 | 40 | 1 | 2 | -15 | -0.375 |
| AP2 | 45 | 38 | 2 | 3 | -7 | -0.184210526 |
| AP3 | 40 | 60 | 3 | 4 | 20 | 0.333333333 |
| AP4 | 25 | 38 | 1 | 2 | 13 | 0.342105263 |
| AP5 | 23 | 38 | 2 | 3 | 15 | 0.394736842 |
| AP6 | 15 | 20 | 3 | 4 | 5 | 0.25 |

FIG. 3

EFFICIENT ROAMING OF MOBILE CLIENTS

RELATED APPLICATION

This application is related to U.S. patent application Ser. No. 13/931,629, entitled "SYSTEM AND METHOD FOR EFFICIENT STATE SYNCHRONIZATION AMONG NEIGHBORING NETWORK DEVICES," filed on 28 Jun. 2013, the content of which is herein incorporated in its entirety.

FIELD

Embodiments of the present disclosure relate to client management in wireless local area networks. In particular, embodiments of the present disclosure describe a method and system for efficient mobile client device roaming in a wireless local area network with multiple access points.

BACKGROUND

With present technologies, in a wireless local area network (WLAN) having multiple access points (APs), a client device can be matched to the best AP in the WLAN. Nevertheless, how to achieve efficient roaming in a multi-AP wireless environment remains to be a challenge to be solved.

The Institute of Electrical and Electronics Engineers (IEEE) 802.11 standards generally refers to a set of media access control (MAC) and physical layer (PHY) specifications for implementing wireless local area network (WLAN) computer communications. However, the IEEE 802.11 standards do not include any specifications for a multi-AP environment, but only specify how one or more client devices can communicate with a single AP in the WLAN.

Recent IEEE 802.11 proposals have been focusing on how to facilitate client device to make efficient roaming decisions. Nevertheless, the recent proposals typically rely on client devices to make decisions regarding which AP the client devices shall roam to. Over the past few years, client devices have become more intelligent at making roaming decisions. Yet no standardized roaming behavior is observed from the client devices in a WLAN.

When a client device is associated with an AP, the client device continuously scans through different wireless communication channels in the background to determine which other APs within the physical proximity of the client device are sending out signals advertising the same Service Set Identifier (SSID) as the AP that the client device is currently associated with. Therefore, if the connection between the client device and the current AP breaks, the client device already has the knowledge of other APs in the WLAN that it can connect to.

In a multi-AP environment, it is up to the client device to determine which AP to connect to when the connection between the client device and the current AP drops below a threshold level. On the other hand, the client device typically will choose an AP based on which AP is associated with the strongest signal strength at a particular point of time. This may lead to at least two potential problems. First, the AP chosen at the particular point of time may not be the best AP over a long term. Second, a client device will likely need to roam from one AP to another AP more frequently if the client device makes a poor choice regarding which AP to connect to.

Meanwhile, voice and video applications have become prevalent among client devices in WLANs. Specifically, smartphones nowadays have capabilities of transmitting both voice and data over the WLAN. Accordingly, roaming of such mobile client devices becomes an important issue, because users expect to have seamless mobility in mobile client devices. Hence, an efficient roaming mechanism for mobile client devices in a multi-AP environment is desirable.

DETAILED DESCRIPTION

In the following description, several specific details are presented to provide a thorough understanding. While the context of the disclosure is directed to client management in wireless local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 3 shows exemplary parameters calculated to achieve efficient roaming of wireless mobile devices according to embodiments of the present disclosure.

OVERVIEW

Embodiments of the present disclosure relate to client management in wireless local area networks. In particular, embodiments of the present disclosure describe a method and system for efficient mobile client device roaming in a wireless local area network with multiple access points.

Specifically, embodiments of the present disclosure provide for efficient roaming for mobile clients by helping client devices judiciously select an access point (AP) for wireless roaming. The mechanism described herein significantly reduces both the roaming latency and the number of forced roaming events. More specifically, the disclosed system selects the best subset of APs for a client device to roam to according to the APs' signal-strength differentials instead of signal strengths alone. As such, an AP is more likely to be selected by a roaming client device if the AP is located in the direction towards which the client device is moving. Hence, embodiments of the present disclosure provide a pro-active solution to achieve efficient roaming for mobile client devices, instead of being reactive and attempting to move the client devices after identifying that the APs that the client devices selected for roaming was inappropriate or inefficient.

With the solution provided herein, a network device can determine a first received signal strength value for a first set of signals transmitted between a client device and a first access point during a first time period. Then the network device can determine a second received signal strength value for a second set of signals transmitted between a client device and the first access point during a second time period. Based at least on (a) the first signal strength value and (b) the second signal strength value, the network device computes a first change in signal strength value corresponding to wireless communication between the client device and the first access point. Furthermore, based at least on first change in signal strength value, the network device selects the first access point from a plurality of access points for providing network access to the client device.

Network Environment

A. Wireless Local Area Network

Figure 1A:
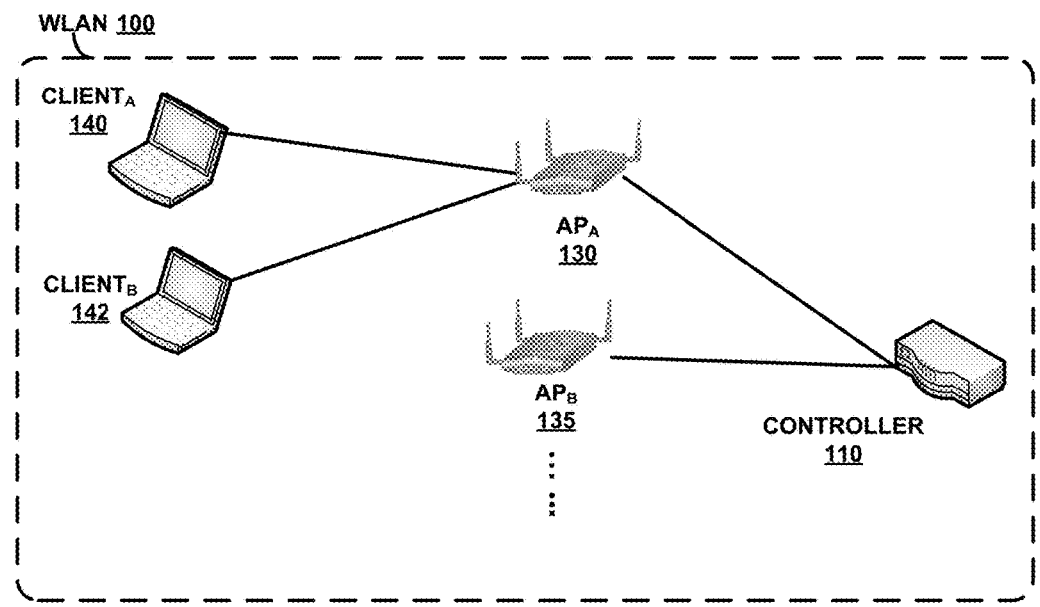
FIG. 1A shows an exemplary wireless local area network environment according to embodiments of the present disclosure.

FIG. 1A shows an exemplary wireless local area network (WLAN) environment according to embodiments of the present disclosure. WLAN 100 as illustrated in FIG. 1A includes at least a network controller 110, a number of access points (such as, $AP_A$ 130, $AP_B$ 135, etc.), and a number of client devices (such as, $Client_A$ 140, $Client_B$ 142, etc.).

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Access points, e.g., $AP_A$ 130 and $AP_B$ 135, generally refer to a set of wireless network devices that allow wireless client devices to connect to a wired network using IEEE 802.11 or related standards. The APs usually connect to a router via a wired network, but can also be an integral component of the router itself. Each access point serves one or more client devices.

Each client device can be associated with an access point in WLAN 100 via a wireless client access process. The wireless client access process involves at least three steps—active or passive channel scanning of surrounding wireless access points, authentication, and association. For illustration purposes only, assuming that $Client_A$ 140 and $Client_B$ 142, is associated with $AP_A$ 130.

B. Channel Scanning

Figure 1B:
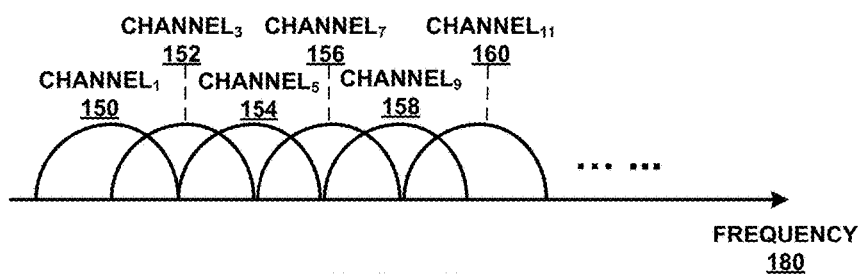
FIG. 1B shows exemplary wireless communication channels in a WLAN according to embodiments of the present disclosure.

FIG. 1B illustrates exemplary wireless communication channels in a WLAN. Specifically, a number of overlapping channels, such as, $Channel_1$ 150, $Channel_3$ 152, $Channel_5$ 154, $Channel_7$ 156, $Channel_9$ 158, $Channel_{11}$ 160, etc., cover one or more frequency bands as frequency 180 corresponding to each channel increases. For example, there are 14 channels designated in the 2.4 GHz range. Each channel is spaced 5 MHz apart. Thus, $Channel_1$ 150 may correspond to 2.412 GHz frequency; $Channel_3$ 152 may correspond to 2.422 GHz frequency; $Channel_5$ 154 may correspond to 2.432 GHz frequency; $Channel_7$ 156 may correspond to 2.442 GHz frequency; $Channel_9$ 158 may correspond to 2.452 GHz frequency; $Channel_{11}$ 160 may correspond to 2.462 GHz frequency; etc.

A client device may adopt either an active channel scanning scheme or a passive channel scanning scheme. During an active channel scanning scheme, the client device actively searches for an AP. In particular, the client device sends probe requests on each channel it is configured to use (e.g., $Channel_1$ 150 to $Channel_{11}$ 160 in North America) and waiting for probe responses from the APs (e.g., $AP_A$ 130, $AP_B$ 135, etc.) in WLAN 100. The probe requests typically are transmitted as broadcast messages in WLAN 100. The client device then determines which AP is the ideal one to roam to. Active channel scanning mechanism is the most thorough mechanism used to find APs because it actively sends out probe requests across all channels to find an AP. However, it requires the client device to dwell on a particular non-operating channel for at least a predetermined length of time (e.g., 10 ms to 20 ms) and wait for the probe response from the APs.

On the other hand, during a passive channel scanning scheme, the client device does not transmit any frames but listens for beacon frames on each channel. The client device continues to change channels at a predetermined interval. With passive scanning, the client device iterates through the channels slower than active scanning because it is listening for beacons that are sent out by APs at a set rate (e.g., 10 beacons per second). The client device must dwell on each channel for a longer time duration to make sure it receives beacons from as many APs as possible for the given channel.

The passive channel scanning scheme has the benefit of not requiring the client device to transmit probe requests but runs the risk of potentially missing an AP, because the client device might not receive a beacon during the scanning duration. The active channel scanning scheme has the benefit of actively seeking out APs to associate to but requires the client to actively transmit probes.

C. Roaming Client

Figure 2:
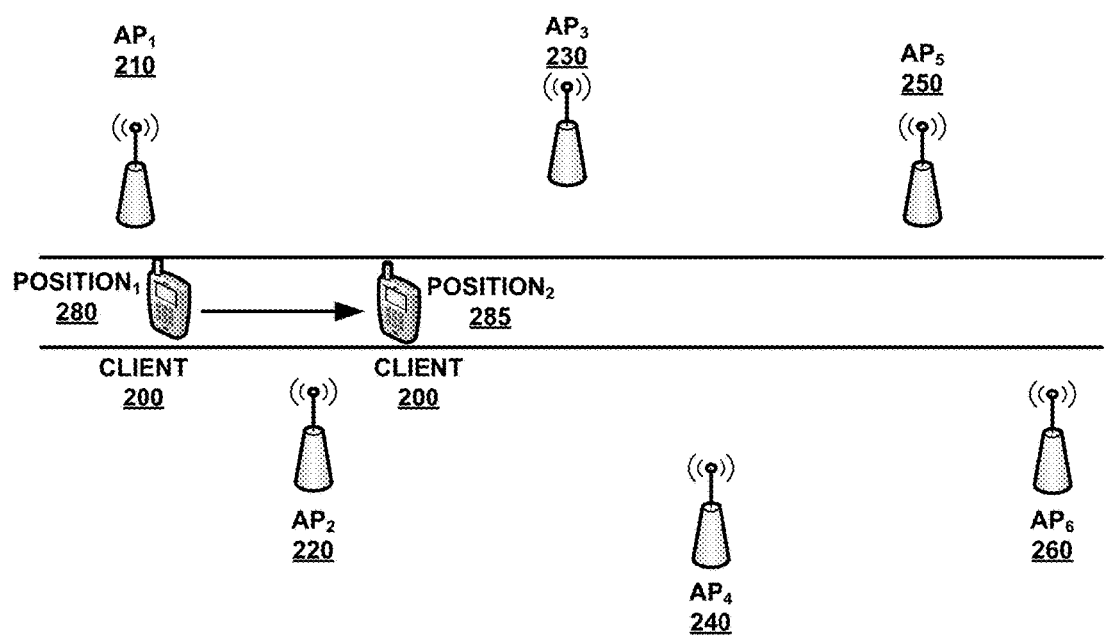
FIG. 2 shows an exemplary wireless network environment with a roaming client device and multiple access points according to embodiments of the present disclosure.

FIG. 2 shows an exemplary wireless network environment with a roaming client device and multiple access points. FIG. 2 includes at least a client device 200 and a number of access points, such as, $AP_1$ 210, $AP_2$ 220, $AP_3$ 230, $AP_4$ 240, $AP_5$ 250, $AP_6$ 260, etc. For illustration purposes only, assuming that client device 200 moves from $Position_1$ 280 to $Position_2$ 285.

When client device 200 moves while sending and receiving data, client device 200 performs channel scanning to figure out the best AP to roam to. As described above, during active channel scanning, client device 200 will send out probe requests on each wireless channel. All of the APs in the vicinity of client device 200 can measure the signal strength of the probe request message received from client device 200 at different snapshots in time. Note that, due to different locations, transmit powers, radio frequency environment interferences, and other variables, different APs may obtain different signal strength values of the same probe request message. Likewise, the same AP may obtain different values of probe request messages from the same client device at different points of time.

Each AP and/or a network controller can then compute a differential of signal strength with regard to time, e.g., dS/dt, or a normalized differential of signal strength with regard to time, e.g., (dS/dt)/S2. The APs and/or the network controller then select a subset of APs based on the highest positive differential of signal strength with regard to time or the highest positive normalized differential of signal strength with regard to time, and then facilitate client device 200 to roam to the selected subset of APs.

Specifically, after the subset of APs for roaming client device 200 is selected, the neighboring APs that do not belong to the subset will refrain from responding to any further probe requests received from client device 200. Thus, only the APs belonging to the subset will respond to the probe requests received from client device 200 when client device 200 decides to roam.

Efficient Roaming Based on Signal Strength Differential

FIG. 3 shows exemplary parameters calculated to achieve efficient roaming of wireless mobile devices according to embodiments of the present disclosure. FIG. 3 includes one or more fields indicating AP 310, signal strength S1 320, signal strength S2 330, time t1 340, time t2 350, signal strength differential (dS/dt) 360, and normalized signal strength differential (dS/dt)/S2 370, etc.

For example, according to FIG. 3, when t1=1 s, AP1 receives a first signal from a particular client device with a received signal strength S1=55 dB. Thereafter, when t2=2 s, AP1 receives a second signal from the particular client device with a received signal strength S2=40 dB. Thus, the signal strength differential with regard to time for signals received from the particular client device as measured by AP1 would be dS/dt=(S2−S1)/(t2−t1)=(40−55)/(2−1)=−15. The negative slope indicates that the signal strength of the signal received by AP1 at time point t2 is weaker than the signal strength of the signal received by AP1 at time point t1. Alternatively, a normalized signal strength differential with regard to time for signals received from the particular client device can be computed as (dS/dt)/S2=−15/40= −0.375.

In this example, assuming that client device is currently associated with AP1. Therefore, the network infrastructure (e.g., the APs and/or the network controller) would determine whether the signal strength at time point t2 is lower than a predetermined threshold. If so, the network infrastructure will instruct AP1 either to dis-associate with the particular client device and to refrain from responding to any further probing messages received from the particular client device. In some embodiments, the network infrastructure may compare the signal strength differential with regard to time (e.g., dS/dt) and/or the normalized signal strength differential with regard to time (e.g., (dS/dt)/S2) with a predetermined threshold to determine whether AP1 should dis-associate with the particular client device.

In some embodiments, the differential of signal strength with regard to time, e.g., dS/dt, Can be computed by each AP and/or a network controller. The signal strength differential provides a slope value, which indicates whether the signal strength corresponding to signals received from a particular client device is increasing or decreasing. Moreover, the signal strength differential further indicates at what rate the signal strength changes. Based on such information, the network infrastructure can infer whether the particular client device is moving towards, moving away from, or moving in parallel to the AP measuring the signals.

Referring to FIG. 3, as another example, when t1=3 s, AP3 receives a first signal from a particular client device with a received signal strength S1=40 dB. Thereafter, when t2=4 s, AP3 receives a second signal from the particular client device with a received signal strength S2=60 dB. Thus, the signal strength differential with regard to time for signals received from the particular client device as measured by AP3 would be dS/dt=(S2−S1)/(t2−t1)=(60−40)/(4−3)=20. The positive slope indicates that the signal strength of the signal received by AP3 at time point t4 is stronger than the signal strength of the signal received by AP3 at time point t3. Alternatively, a normalized signal strength differential with regard to time for signals received from the particular client device can be computed as (dS/dt)/S2=20/60=0.333333333.

Now referring to AP5 in FIG. 3, when t1=2 s, AP5 receives a first signal from a particular client device with a received signal strength S1=23 dB. Thereafter, when t2=3 s, AP5 receives a second signal from the particular client device with a received signal strength S2=38 dB. Thus, the signal strength differential with regard to time for signals received from the particular client device as measured by AP5 would be dS/dt=(S2−S1)/(t2−t1)=(38−23)/(3−2)=15. Alternatively, a normalized signal strength differential with regard to time for signals received from the particular client device can be computed as (dS/dt)/S2=15/38=0.394736842.

Figure 4A:
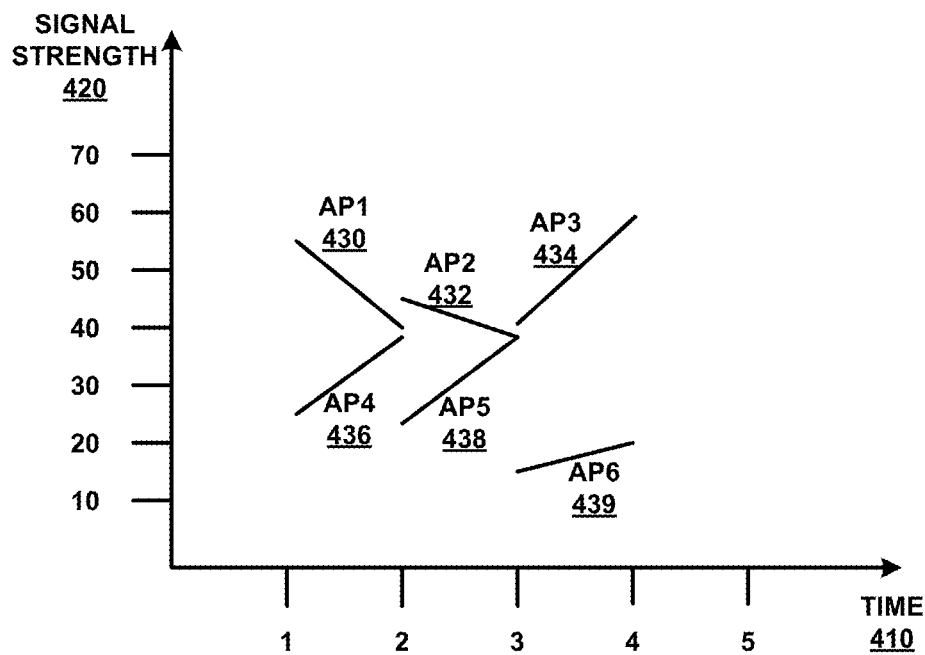
FIGS. 4A-4B show an exemplary access point selection mechanism for efficient roaming of wireless mobile devices according to embodiments of the present disclosure.
Figure 4B:
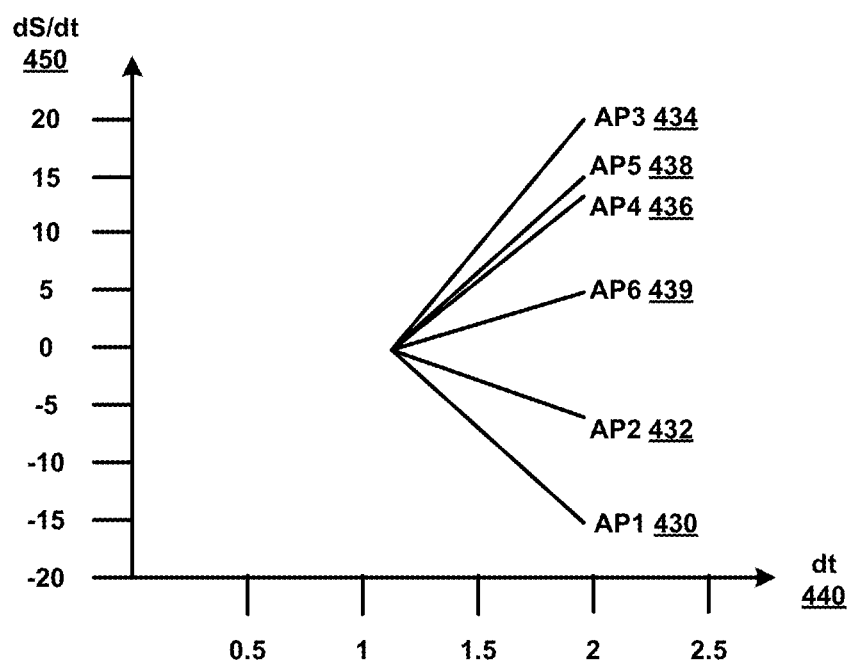

FIGS. 4A-4B show an exemplary access point selection mechanism for efficient roaming of wireless mobile devices according to embodiments of the present disclosure. Specifically, the horizontal axis in FIG. 4A shows various points of time 410, whereas the vertical axis in FIG. 4A shows the signal strength 420 of signals received from a particular client device by various APs in the network. The APs include, but are not limited to, AP1 430, AP2 432, AP3 434, AP4 436, AP5 438, AP6 439, etc. Moreover, the horizontal axis in FIG. 4B shows relative change of time dt 440, whereas the vertical axis in FIG. 4B shows the relative change in signal strength 450 of signals received from a particular client device by various APs in the network. According to FIG. 4B, the signal strength differentials with regard to time as measured by the APs in the WLAN can be sorted as the following, from the highest positive slope to the lowest negative slope, AP3 434, AP5 438, AP4, 436, AP6 439, AP2 432, AP1 430.

A typical client device will start active scanning, e.g., by frequently sending probe requests on different wireless communication channels upon detecting that the signal strength value of a signal between the AP and the particular client device drops below a threshold value. Accordingly, when the particular client device observes poor signal strength from the associated AP, the particular client device will frequently switch off its operating channel and transmit more probe request messages on different wireless communication channels. Meanwhile, each AP continuous and simultaneously measures the signal strength of signals received from client devices in the physical proximity of each AP. Thus, all APs capable of communicating on the same channel as the client device (including both the operating channel and the non-operating channels) will detect the signals originated from the client device, and measure the signal strength during approximately the same time period.

Thus, by comparing the signal strength differential with regard to time as measured by various APs in the neighborhood of a particular client device, the APs and/or the network controller can then select a subset of APs with the highest positive slope values, e.g., AP3 434 and AP5 438. Also, the current signal strength of signals received from the particular client device by any of the selected APs is higher than a predetermined threshold value. The network infrastructure can then facilitate the particular client device to roam to the selected subset of APs.

In some embodiments, based on the differential of signal strength with regard to time as shown in FIG. 3, the AP having the highest positive slope (e.g., AP3 434) will be selected as the target AP, because it can be inferred that the client device is moving towards that AP.

In the example illustrated in FIG. 2, assuming that $AP_2$ 220 is moved perpendicularly to client device 200's trajectory and now closer to client device 200. Thus, $AP_2$ 220 may be observing a higher signal strength value than the signal strength value of the signals received from client device 200 that $AP_3$ 230 is observing. Nevertheless, the network infrastructure will select $AP_3$ 230 rather than $AP_2$ 220 as the target AP for client device 200 to roam to, because $AP_2$ 220 is associated with a negative differential of signal strength. Thus, AP2 220 is not a good candidate as target AP for client device 200, because even though the current signal strength of signals from client device 200 observed at $AP_2$ 220 may be high, client device 200 is roaming away from $AP_2$ 220. If AP2 220 becomes the target AP, client device 200 would likely experience signal strength degradation soon after association and would need to be disassociated with $AP_2$ 220 very soon.

In some embodiments, the AP to which a particular client device is currently associated is known to all of the neighboring APs by virtue of the session-request message that an AP broadcasts to the network whenever a client device associates to it. Hence, all of the neighboring APs that are capable of receiving signals from the particular client device can calculate the slope as described above, and periodically send the results to the AP to which the particular client device is currently associated. Alternatively, a network controller, a server, and/or a virtual controller can collect and analyze the results computed by and received from the neighboring APs. In some embodiments, the session-request message includes signal strength differentials associated with all signals received from a particular client device within a predetermined period of time, e.g., the most recent 10 seconds. Then, the associated AP selects a subset of APs where the client device should roam to by comparing the differentials of signal strength with regard to time (e.g., dS/dt) collected by the neighboring APs.

The associated AP can further inform all of the neighboring APs the subset of APs. This can be efficiently achieved by sending a message to neighboring APs using mechanisms. An exemplary of messaging mechanism is disclosed in U.S. patent application Ser. No. 13/931,629, entitled "SYSTEM AND METHOD FOR EFFICIENT STATE SYNCHRONIZATION AMONG NEIGHBORING NETWORK DEVICES," filed on 28 Jun. 2013, the content of which is herein incorporated in its entirety.

Thereafter, when the client device sends a probe request, an authentication request, and/or an association request, only the APs in the subset selected by the associated AP will respond and hence the client will naturally roam to only the selected subset of APs. This mechanism leads to high efficiency of client roaming, because it reduces both roaming latency and the number of roaming events. The roaming client device can be associated with the new AP for a longer duration since the client device is moving towards the new AP.

Efficient Roaming Based on Normalized Signal Strength Differential

Alternatively, the APs and/or the network controller can normalize the differential of signal strength with regard to time with current signal strength measured by a particular AP, e.g., (dS/dt)/S2. The APs and/or the network controller can also use the normalized differential of signal strength with regard to time to select the furthest acceptable AP that client device is moving towards.

Figure 5A:
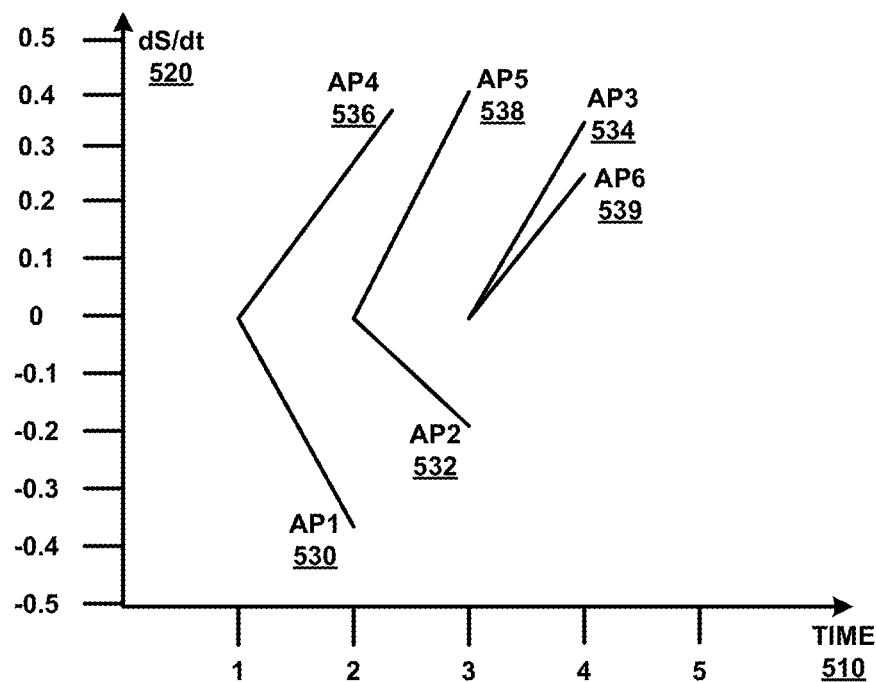
FIGS. 5A-5B show an exemplary access point selection mechanism for efficient roaming of wireless mobile devices according to embodiments of the present disclosure.
Figure 5B:
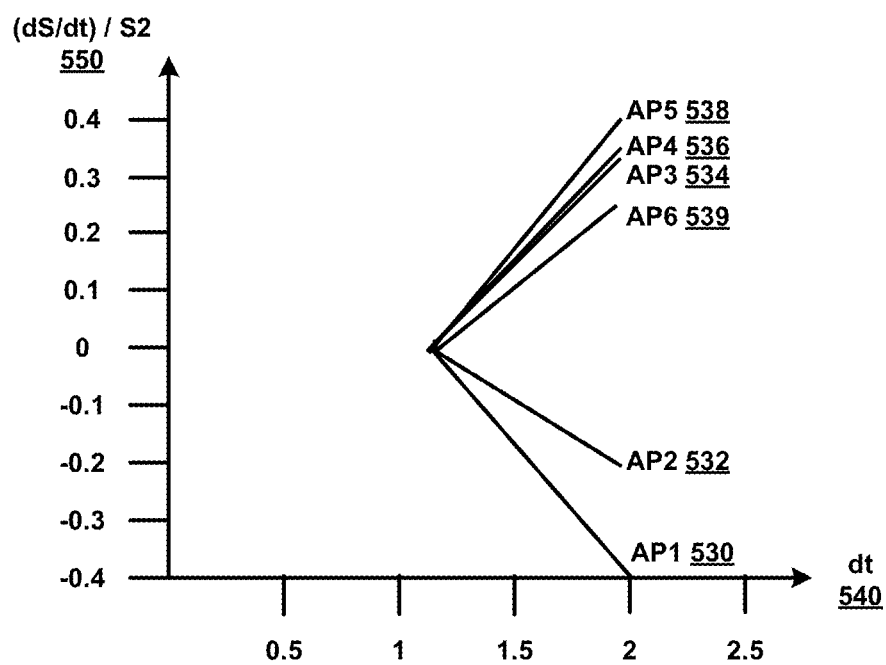

FIGS. 5A-5B show an alternative exemplary access point selection mechanism for efficient roaming of wireless mobile devices according to embodiments of the present disclosure. Specifically, the horizontal axis in FIG. 5A shows various points of time 510, whereas the vertical axis in FIG. 5A shows the differentials of signal strength (e.g., dS/dt) 520 for signals received from a particular client device by various APs in the network. The APs include, but are not limited to, AP1 530, AP2 532, AP3 534, AP4 536, AP5 538, AP6 539, etc.

Moreover, the horizontal axis in FIG. 5B shows relative change of time dt 540, whereas the vertical axis in FIG. 5B shows the normalized differentials of signal strength (e.g., (dS/dt)/S2) 550 for signals received from a particular client device by various APs in the network. According to FIG. 5B, the normalized signal strength differentials with regard to time as measured by the APs in the WLAN can be sorted as the following: AP5 538, AP4 536, AP3 534, AP6 539, AP2 532, AP1 530, from the highest positive slope to the lowest negative slope.

Note that, APs observing the same differential of signal strength may correspond to different signal strength values. The higher the current signal strength is, the lower the normalized differential of signal strength would be. In other words, an AP that is far away from the client device but located in the direction towards which the client device is moving will likely be associated with a high normalized differential of the signal strength. When the current signal strength associated with the AP is above an acceptable threshold value, the roaming client device is likely to be associated with the AP for a longer duration than another AP that is located closer to the roaming client device's current location and that is associated with a higher signal strength level but lower signal strength differential.

Thus, by comparing the signal strength differentials with regard to time as measured by various APs in the neighborhood of a particular client device, the APs and/or the network controller can then select a subset of APs with the highest positive slope values, e.g., AP5 538. Note that, the current signal strength of signals received from the particular client device by any of the selected APs shall be higher than a predetermined threshold value.

Moreover, the APs in the neighborhood shall measure the signal strength of signals received from the particular client device when the particular client device is located at approximately the same location, e.g., $Position_1$ 280 and/or $Position_2$ 285, because the measurements may not be comparable if the particular client device has significantly changed its physical location between different measurements.

The network infrastructure can then facilitate the particular client device to roam to the selected subset of APs with the highest positive normalized differential of signal strength with regard to time as long as the signal strength and/or the slope is above a predetermined threshold value.

In the example illustrated in FIG. 2, client device 200 is moving from $Position_1$ 280 to $Position_2$ 285. If $AP_5$ 250, which observes the highest normalized differential of signal strength among neighboring APs, is chosen as the new AP for roaming client device 200, client device 200 may be able to remain associated with AP5 for a longer period of time. On the other hand, if $AP_3$ 230, which observes the highest differential of signal strength among neighboring APs, is chosen as the new AP for roaming client device 200, client device 200 will likely need to be associated with another AP (e.g., AP6 260) soon as client device 200 continues to move along the same direction and beyond $Position_2$ 285. Therefore, by choosing $AP_5$ 250 over $AP_3$ 230 in this case, the network infrastructure effectively reduces the number of roaming events for client device 200.

In some embodiments, besides a first signal strength differential between the last two sets of received signals from a particular client device, an AP also calculates a second differential between the third to last measurement and the second to last measurement of the received signals from the particular client device. Next, the AP compares the first differential with the second differential. If the first differential and the second differential are comparable, then it can be inferred that the particular client device is moving towards the same direction at a steady pace. On the other hand, if the first differential and the second differential are significantly different, then it implies that the movement of the particular client device is irregular in the direction of the AP.

The network infrastructure (e.g., an AP, a network controller, a server, etc.) can then determine the subset of APs for the particular client to roam to based on the above inferences. For example, if it is determined that the particular client device is moving steadily towards an AP, the network infrastructure can include only a single AP in the subset of APs for the particular client device to roam to. Thus, all other APs in the neighborhood will receive a message indicating that they should refrain from responding to probe requests received from the particular client device. By contrast, if it is determined that the particular client device is moving in a relatively random fashion rather than a steady pace towards a consistent direction, the network infrastructure may include a number of APs in the neighborhood in the subset of APs selected for the particular client device to roam to.

In the example illustrated in FIG. 2, client device 200 is moving from $Position_1$ 280 to $Position_2$ 285. Assuming that based on the first differential and the second differential, it is determined that client device 200 has stopped moving at $Position_2$ 285. Accordingly, the network infrastructure may select $AP_3$ 230 (which observes the highest differential of signal strength among the neighboring APs) rather than $AP_5$ 250 (which is farther away than $AP_3$ 230 but observes the highest differential of signal strength among the neighboring APs) as the AP for client device 200 to roam to.

Process for Efficient Roaming for Wireless Mobile Devices

Figure 6:
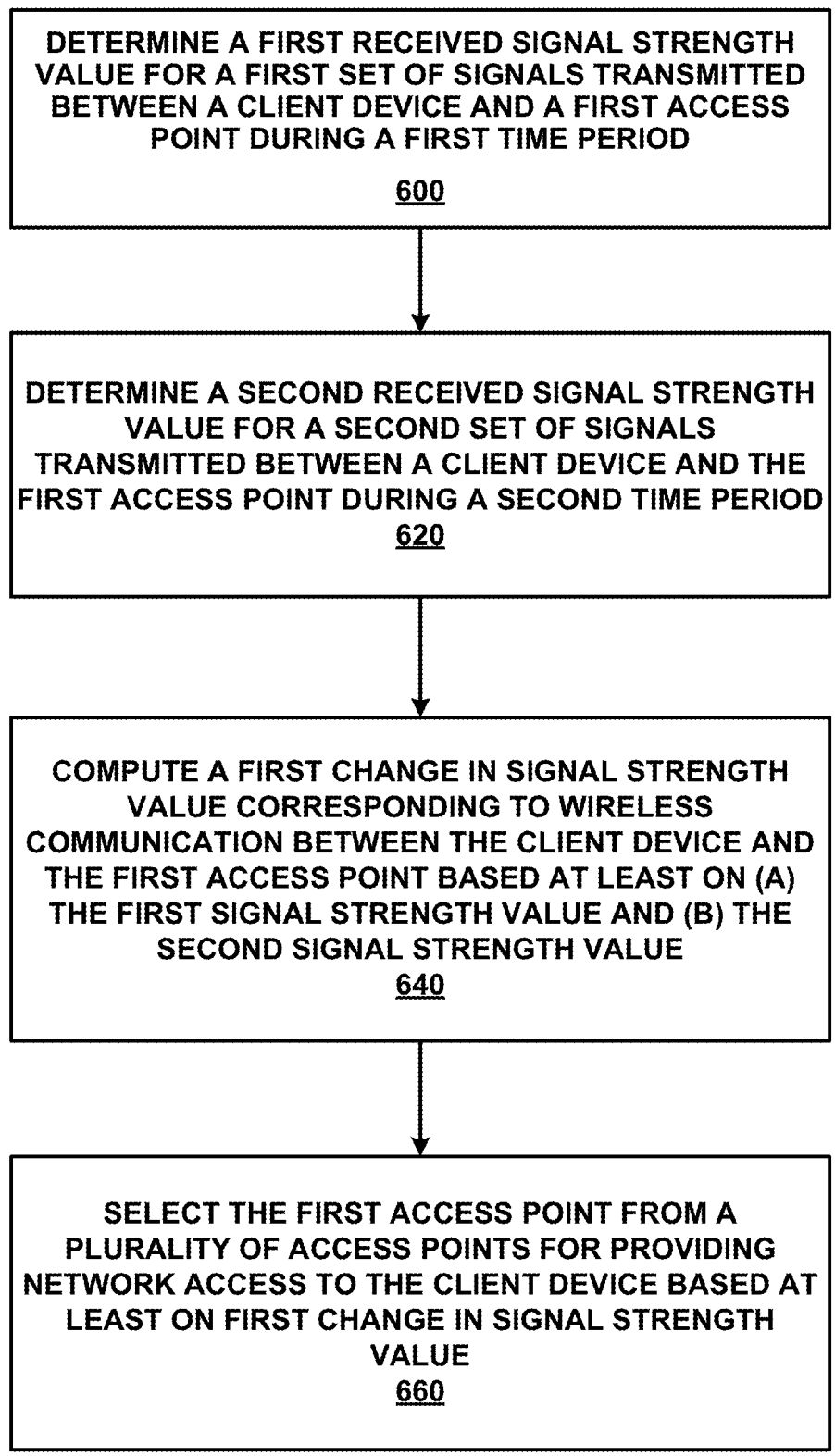
FIG. 6 shows an exemplary process for efficient roaming of mobile devices in a multi-AP environment according to embodiments of the present disclosure.

FIG. 6 shows an exemplary process for efficient roaming for wireless mobile client devices according to embodiments of the present disclosure. During operations, a network device determines a first received signal strength value for a first set of signals transmitted between a client device and a first access point during a first time period (operation 600). Then, the network device can determine a second received signal strength value for a second set of signals transmitted between a client device and the first access point during a second time period (operation 620). Based at least on (a) the first signal strength value and (b) the second signal strength value, the network device computes a first change in signal strength value corresponding to wireless communication between the client device and the first access point (operation 640). Furthermore, based at least on first change in signal strength value, the network device selects the first access point from a plurality of access points for providing network access to the client device (operation 660).

In some embodiments, the first change in signal strength value is computed further based on a time interval between the first time period and the second time period. Note that, the time interval can be either a constant interval or a variable interval. When the signal strength values are measured at variable intervals, the network device may divide the change in signal strength by the difference in time.

In some embodiments, the network device configures at least the first access point to accept a connection request from the client device, and also configures at least a second access point to refrain from accepting a connection request from the client device. Specifically, the client device may be associated with the second access point when the first access point is selected for providing the network access to the client device. In such cases, the network device will cause the client device to disassociate from the second access point. In addition, the second access point can be any other APs that the client device should not be associated with as determined by the network device.

In some embodiments, a third received signal strength value for a third set of signals transmitted between the client device and the second access point during a third time period close to the second time period is greater than the second received signal strength value for the second set of signals transmitted between the client device and the first access point during the second time period. Note that, here, even though the signal strength received at the second access point is greater than the signal strength received at the first access point, the network device will still configure the first AP to accept the connection request from the client device, and configure the second AP to send a disassociation message and/or refrain from accepting connection request from the client device. This is because the client device is moving away from the second access point and towards the direction of the first access point.

In some embodiments, the network device selects a particular subset of two or more access points from the plurality of access points for providing network access to the client device. The particular subset of access points includes the first access point. Also, the network device configures the particular subset of access points to accept a connection request from the client device. In addition, the network device configures access points in the plurality of access points, other than the particular subset of access points, to refrain from accepting a connection request from the client device.

In some embodiments, the network device computes a second change in signal strength value corresponding to wireless communication between the client device and the first access point. One or more access points are selected for providing network access to the client device based at least on difference between the first change in signal strength value and the second change in signal strength value. For example, the first change in signal strength value may be between time point t1 and t2, and the second change in signal strength value may be between time point t0 and t1.

In some embodiments, the network device divides the first change in signal strength value by the second received signal strength value to obtain a particular value. This is also referred to as normalized differential of signal strength with regard to time in the present disclosure. The network device can select the first access point from the plurality of access points based on the particular value.

In some embodiments, the network device determines a third received signal strength value for a third set of signals transmitted between the client device and a second access point during a third time period. Note that, the plurality of access point includes the second access point. The network device then determines a fourth received signal strength value for a fourth set of signals transmitted between the client device and the second access point during a fourth time period. Based at least on (a) the third signal strength value and (b) the fourth signal strength value, the network device computes a second change in signal strength value corresponding to wireless communication between the client device and the second access point. Here, selecting the first access point from the plurality of access points is based at least on the first change in signal strength value corresponding to wireless communication between the client device and the first access point and the second change in signal strength value corresponding to wireless communication between the client device and the second access point.

In some embodiments, the network device selects the first access point further based on determining that the second received signal strength value is above a particular threshold value. The particular threshold value may be dynamically selected based on data transmission rate expected and/or used for communication with the client device.

In some embodiments, the network device selects the first access point in response to a signal strength measurement value between the client device and a current access point being detected below a threshold value. Specifically, the signals received from the client device may include, for example, probe request messages. Note that, a typical client device will start active scanning, e.g., by frequently sending probe requests on different wireless communication channels upon detecting that the signal strength value of a signal between the AP and the client device drops below a threshold value.

In some embodiment, the threshold value can be configured via a roaming aggressiveness parameter by a user and/or network administrator. Thus, a client device with a high roaming aggressiveness threshold will decrease the interval of active scanning when the signal strength of signals from an associated AP drops slightly. By contrast, a client device with a low roaming aggressiveness threshold typically will scan at a relatively large interval.

Meanwhile, each AP continuous and simultaneously measure signal strength of signals received from client devices in the physical proximity. Thus, all APs capable of communicating on the same channel as the client device will detect the signals originated from the client device, and measure the signal strength during approximately the same time period.

System for Efficient Roaming for Wireless Mobile Devices

Figure 7:
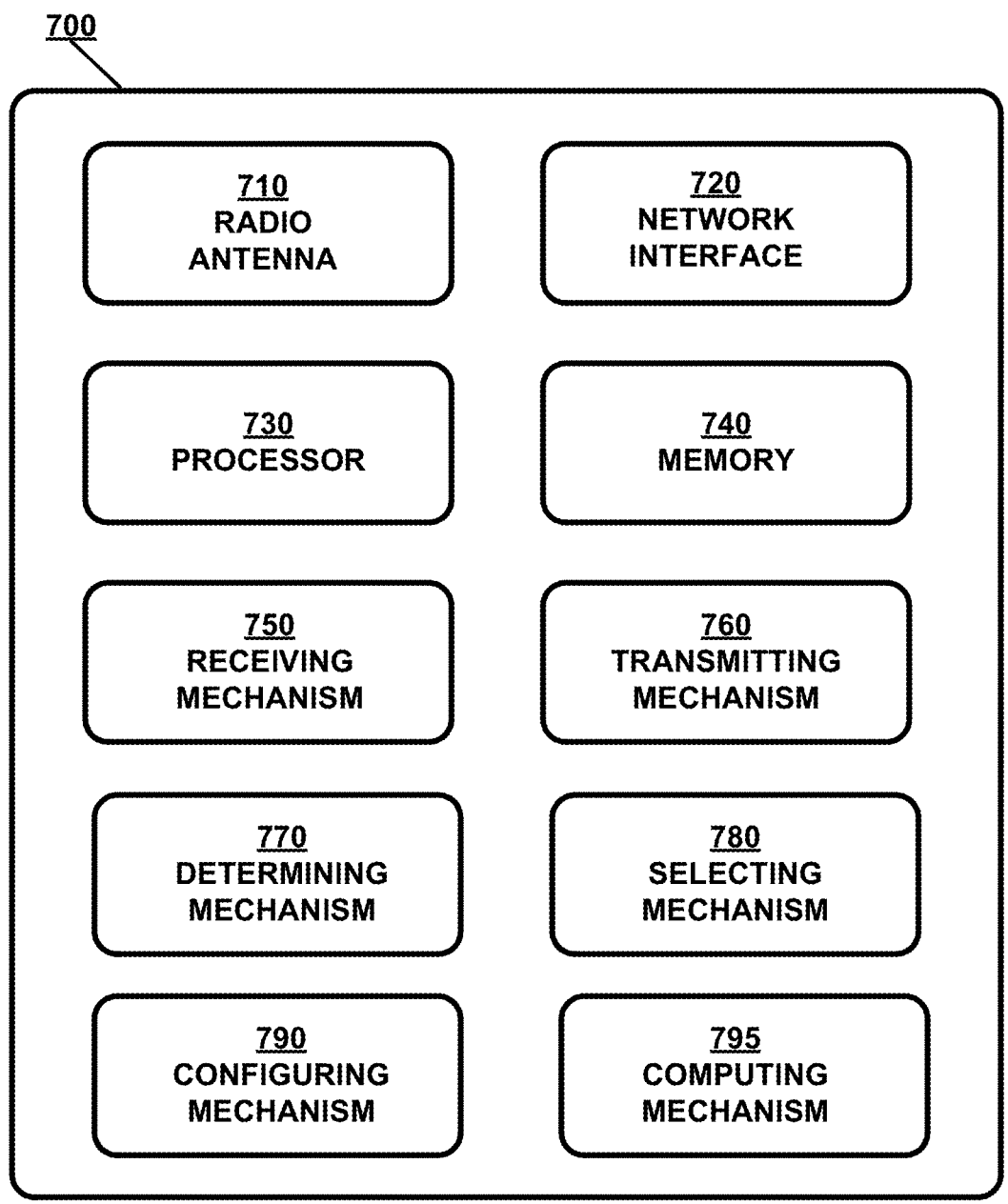
FIG. 7 is a block diagram illustrating an exemplary system for efficient roaming of mobile devices in a multi-AP environment according to embodiments of the present disclosure.

FIG. 7 is a block diagram illustrating an exemplary system for efficient roaming for wireless mobile devices according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, a determining mechanism 770, a selecting mechanism 780, a configuring mechanism 790, and a computing mechanism 795, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors.

Memory 740 can include storage components, such as, Dynamic Random Access Memory (DRAM), Static Random Access Memory (SRAM), etc. In some embodiments, memory 740 stores statuses for users of a WLAN.

Receiving mechanism 750 generally receives one or more network messages via network interface 720 or radio antenna 710 from a wireless client. The received network messages may include, but are not limited to, requests and/or responses, beacon frames, management frames, control path frames, and so on.

Transmitting mechanism 760 generally transmits messages, which include, but are not limited to, requests and/or responses, beacon frames, management frames, control path frames, and so on.

Determining mechanism 770 generally determines a received signal strength value for a set of signals transmitted between a client device and an access point during a particular time period.

Selecting mechanism 780 generally selects an access point or a subset of access points from a plurality of access points for providing network access to the client device. In some embodiments, selecting mechanism 780 selects a first access point based at least on first change in signal strength value. Here, the client device is associated with a second access point when the first access point is selected for providing the network access to the client device.

In some embodiments, selecting mechanism 780 selects the first access point, despite that (a) a third received signal strength value for a third set of signals transmitted between the client device and the second access point during a third time period close to the second time period is greater than (b) the second received signal strength value for the second set of signals transmitted between the client device and the first access point during the second time period.

In some embodiments, selecting mechanism 780 divides the first change in signal strength value by the second received signal strength value to obtain a particular value; and, then selects the first access point from the plurality of access points based on the particular value. In some embodiments, selecting mechanism 780 selects the first access point further based on determining that the second received signal strength value is above a particular threshold value. The particular threshold value can be dynamically selected based on data transmission rate expected and/or used for communication with the client device.

In some embodiments, selecting mechanism 780 selects the first access point in response to a signal strength measurement value between the client device and a current access point being detected below a threshold value.

Configuring mechanism 790 generally causes a client to disassociate with a current AP and associate with a new AP in the radio frequency neighborhood. In some embodiments, configuring mechanism 790 causes a client device to disassociate from a current access point upon one or more access points being selected by selection mechanism 780 for providing network access to the client device based at least on difference between the first change in signal strength value and the second change in signal strength value.

In some embodiments, configuring mechanism 790 configures at least the first access point to accept a connection request from the client device. In some embodiments, configuring mechanism 790 configures at least a second access point to refrain from accepting a connection request from the client device. In some embodiments, configuring mechanism 790 configures a particular subset of access points to accept a connection request from the client device. In some embodiments, configuring mechanism 790 configures access points in the plurality of access points, other than the particular subset of access points, to refrain from accepting a connection request from the client device.

Computing mechanism 795 generally computes a change in signal strength value corresponding to wireless communication between the client device and the first access point. In some embodiments, the change in signal strength value is computed based further on a time interval between the first time period and the second time period. In some embodiments, based at least on change in signal strength value, computing mechanism 795 can estimate a future location of the client device.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
  determining a first received signal strength value of a first probe request transmitted from a client device to a first access point during a first time period;
  determining a second received signal strength value of a second probe request transmitted from the client device to the first access point during a second time period;
  based at least on the first signal strength value and the second signal strength value: computing a first rate of change in signal strength value corresponding to wireless communication between the client device and the first access point;
  based at least on the first rate of change in signal strength value, instructing the first access point from a plurality of access points to provide network access to the client device;
  selecting a particular subset of two or more access points from the plurality of access points for providing network access to the client device, wherein the particular subset of access points comprises the first access point;
  configuring the particular subset of access points to accept a connection request from the client device; and
  instructing access points in the plurality of access points, other than the particular subset of access points, to refrain from responding to a subsequent probe request from the client device.

2. The medium of claim 1, wherein the first rate of change in signal strength value is computed based further on a time interval between the first time period and the second time period.

3. The medium of claim 1, wherein the operations further comprise:
  configuring at least the first access point to accept a connection request from the client device; and
  configuring at least a second access point to refrain from accepting a connection request from the client device.

4. The medium of claim 3, wherein the client device is associated with the second access point when the first access point is selected for providing the network access to the client device, and wherein the operations further comprise causing the client device to disassociate from the second access point.

5. The medium of claim 4, wherein a third received signal strength value for a third probe request transmitted between the client device and the second access point during a third time period close to the second time period is greater than the second received signal strength value for the second probe request transmitted between the client device and the first access point during the second time period.

6. The medium of claim 1, wherein the operations further comprise:
  computing a second rate of change in signal strength value corresponding to wireless communication between the client device and the first access point,
  wherein one or more access points are selected for providing network access to the client device based at least on difference between the first rate of change in signal strength value and the second rate of change in signal strength value.

7. The medium of claim 1, wherein selecting the first access point from the plurality of access points based on the first rate of change in signal strength value comprises:
  dividing the first rate of change in signal strength value by the second received signal strength value to obtain a particular value; and
  selecting the first access point from the plurality of access points based on the particular value.

8. The medium of claim 1, wherein the operations further comprise:
  determining a third received signal strength value for a third probe request transmitted between the client device and a second access point during a third time period, wherein the plurality of access point comprises the second access point;
  determining a fourth received signal strength value for a fourth probe request transmitted between the client device and the second access point during a fourth time period;
  based at least on the third signal strength value and the fourth signal strength value: computing a second rate of change in signal strength value corresponding to wireless communication between the client device and the second access point;
  wherein selecting the first access point from the plurality of access points is based at least on the first rate of change in signal strength value corresponding to wireless communication between the client device and the first access point having a greater positive value than the second rate of change in signal strength value corresponding to wireless communication between the client device and the second access point.

9. The medium of claim 1, wherein selecting the first access point is further based on determining that the second received signal strength value is above a particular threshold value.

10. The medium of claim 9, wherein the particular threshold value is dynamically selected based on a data transmission rate associated with communication with the client device.

11. The medium of claim 1, wherein the selecting operation is further in response to a signal strength measurement value between the client device and a current access point being detected below a threshold value.

12. A non-transitory computer readable medium comprising instructions which, when executed by one or more hardware processors, causes performance of operations comprising:
  determining a first received signal strength value of a first probe request transmitted from a client device to a first access point during a first time period;
  determining a second received signal strength value of a second probe request transmitted from the client device to the first access point during a second time period;
  based at least on the first signal strength value and the second signal strength value: computing a first rate of change in signal strength value corresponding to wireless communication between the client device and the first access point;
  based at least on the first rate of change in signal strength value, estimating a future location of the client device;
  selecting, based on the future location, a particular subset of two or more access points from a plurality of access points for providing network access to the client device;
  configuring the particular subset of access points to accept a connection request from the client device; and
  instructing access points in the plurality of access points, other than the particular subset of access points, to refrain from responding to a subsequent probe request from the client device.

13. A system comprising:
at least one device including a hardware processor;
the system being configured to perform operations comprising:
determining a first received signal strength value of a first probe request transmitted from a client device to a first access point during a first time period;
determining a second received signal strength value of a second probe request transmitted from the client device to the first access point during a second time period;
based at least on the first signal strength value and the second signal strength value: computing a first rate of change in signal strength value corresponding to wireless communication between the client device and the first access point;
based at least on the first rate of change in signal strength value, instructing the first access point from a plurality of access points to provide network access to the client device;
selecting a particular subset of two or more access points from the plurality of access points for providing network access to the client device, wherein the particular subset of access points comprises first access point;
configuring the particular subset of access points to accept a connection request from the client device; and
instructing access points in the plurality of access points, other than the particular subset of access points, to refrain from responding to a subsequent probe request from the client device.

14. The system of claim 13, wherein the first rate of change in signal strength value is determined based further on a time interval between the first time period and the second time period.

15. The system of claim 13, wherein the operations further comprise:
configuring at least the first access point to accept a connection request from the client device; and
configuring at least a second access point to refrain from accepting a connection request from the client device.

16. The system of claim 13, wherein the operations further comprise:
computing a second rate of change in signal strength value corresponding to wireless communication between the client device and the first access point,
wherein one or more access points are selected for providing network access to the client device based at least on difference between the first rate of change in signal strength value and the second rate of change in signal strength value.

17. The system of claim 13, wherein selecting the first access point from the plurality of access points based on the first rate of change in signal strength value comprises:
dividing the first rate of change in signal strength value by the second received signal strength value to obtain a particular value; and
selecting the first access point from the plurality of access points based on the particular value.

18. The system of claim 13, wherein the operations further comprise:
determining a third received signal strength value for a third set of signals transmitted between the client device and a second access point during a third time period, wherein the plurality of access points comprise the second access point;
determining a fourth received signal strength value for a fourth set of signals transmitted between the client device and the second access point during a fourth time period;
based at least on the third signal strength value and the fourth signal strength value: computing a second rate of change in signal strength value corresponding to wireless communication between the client device and the second access point;
wherein selecting the first access point from the plurality of access points is based at least on the first rate of change in signal strength value corresponding to wireless communication between the client device and the first access point and the second rate of change in signal strength value corresponding to wireless communication between the client device and the second access point.

* * * * *